US007991914B2

(12) United States Patent
Chauffour et al.

(10) Patent No.: US 7,991,914 B2
(45) Date of Patent: *Aug. 2, 2011

(54) TECHNIQUE FOR ADDRESSING A CLUSTER OF NETWORK SERVERS

(75) Inventors: Pascal Chauffour, Cagnes sur Mer (FR); Eric Lebrun, Carros (FR); Valerie Mahe, Nice (FR)

(73) Assignee: International Business Machines Corporation, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/332,196

(22) Filed: Dec. 10, 2008

(65) Prior Publication Data

US 2009/0144444 A1    Jun. 4, 2009

Related U.S. Application Data

(63) Continuation of application No. 10/676,456, filed on Sep. 30, 2003, now Pat. No. 7,480,737.

(30) Foreign Application Priority Data

Oct. 25, 2002   (FR) ..................................... 02368119

(51) Int. Cl.
*G06F 15/16* (2006.01)
(52) U.S. Cl. ........................................ 709/245; 709/219
(58) Field of Classification Search .................. 709/219, 709/245, 226
See application file for complete search history.

(56) References Cited

U.S. PATENT DOCUMENTS

| 6,128,279 | A | 10/2000 | O'Neil et al. | |
|---|---|---|---|---|
| 6,691,165 | B1 | 2/2004 | Bruck et al. | |
| 6,801,949 | B1 * | 10/2004 | Bruck et al. | 709/232 |
| 6,910,148 | B1 | 6/2005 | Ho et al. | |
| 7,055,173 | B1 | 5/2006 | Chaganty et al. | |
| 7,146,233 | B2 | 12/2006 | Aziz et al. | |
| 7,254,834 | B2 | 8/2007 | Goddard | |
| 7,480,737 | B2 * | 1/2009 | Chauffour et al. | 709/245 |
| 7,693,048 | B1 * | 4/2010 | O'Riordan | 370/219 |
| 7,739,384 | B2 * | 6/2010 | Siev et al. | 709/226 |
| 7,900,040 | B2 * | 3/2011 | Brendel | 713/153 |
| 2003/0069968 | A1 | 4/2003 | O'Neil et al. | |
| 2003/0131262 | A1 | 7/2003 | Goddard | |

* cited by examiner

*Primary Examiner* — Douglas B Blair
(74) *Attorney, Agent, or Firm* — Arthur J. Samodovitz

(57) ABSTRACT

A single firewall or cluster of firewalls with a public IP address is interfaced to an internet public subnet to receive service requests for a cluster of network servers. A first private subnet with a plurality of private IP addresses is interfaced to the single firewall or cluster of firewalls to receive the service requests after passing through a firewall. A plurality of redundant load balancers with a respective plurality of private IP addresses are interfaced to the first private subnet to receive the service requests after passing through the first private subnet. The load balancers are interfaced to a second private subnet. The network servers with respective private IP addresses are interfaced to the second private subnet to receive the service requests from the load balancers. At an initialization time, a private IP address is defined for the network load balancer system within the internet access subnet. When one of the load balancers becomes primary at the initialization time or switches from a standby state to an active state, the network load balancer system private IP address is defined as an alias in an interface table to be recognized by the one load balancer. When the one network load balancer switches from the active state to a standby state, the network load balancer system private IP address previously defined as the alias is released from the interface table.

7 Claims, 4 Drawing Sheets

TECHNIQUE FOR ADDRESSING A CLUSTER OF NETWORK SERVERS

CROSS REFERENCE TO RELATED APPLICATION

This is a Continuation application of Ser. No. 10/676,456 filed on Sep. 30, 2003 now U.S. Pat. No. 7,480,737, and it is now U.S. Published Patent Application No. 20040113690 A1.

FIELD OF THE INVENTION

The present invention relates generally to communication on digital networks, and more particularly to a system and a method for addressing a plurality of network servers organized in a cluster within an IP network.

BACKGROUND OF THE INVENTION

The Internet is a global network of computers and computers networks (the "Net"). The Internet connects computers that use a variety of operating systems, such as UNIX, DOS, Windows, Macintosh, and others. To facilitate and allow the communication among the various operating systems, the Internet uses a communication language referred to as TCP/IP ("Transmission Control Protocol/Internet Protocol"). TCP/IP protocol supports three basic applications on the Internet transmitting and receiving electronic mail,
logging into remote computers (i.e. "Telnet"), and
transferring files and programs from one computer to another (using "FTP" or "File Transfer Protocol").

TCP/IP

The TCP/IP protocol suite is named for two of the most important protocols—Transmission Control Protocol (TCP), and Internet Protocol (IP) or Internet Protocol Suite. "TCP/IP" is used to refer to the entire protocol suite. The first design goal of TCP/IP is to build an interconnection of networks that provide universal communication services: an "inter network" or "internet" for short. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between two computer systems. Multiple applications can be supported simultaneously over one TCP connection between two computer systems.

IP is an inter network layer protocol hiding the physical network architecture bellow it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Clients and Servers

TCP/IP is a peer-to-peer, connection oriented protocol. There are no master/slave relations. The applications, however, use a client/server model for communications. A server is an application that offers a service to internet users; a client is a requester of service. An application consists of both a server and a client part which can run on the same or on different computer systems. Users usually invoke the client part of the application, which builds a request for a particular service and sends it to the server part of the application using TCP/IP as transport vehicle. The server is a program and associated hardware that receives a request, performs the required service and sends back the result in a reply. A server can usually deal with multiple requests (multiple clients) at the same time.

Ports

Ports are defined to exactly determine which local process at a given time that a host actually communicates with which process at which remote host using which protocol. Each process that wants to communicate with another process identifies itself to the TCP/IP protocol suite by one or more ports. A port is a 16-bit number, used by the host-to-host protocol to identify to which higher level protocol or application process (program) it must deliver incoming messages. There are two types of port:

Well known ports: Well known ports belong to standard servers. For example Telnet uses port twenty three. The well-known ports are controlled and assigned by the Internet central authority (IANA) and on most system can only be used by system processes or by programs executed by privileged users. The reason for well-known ports is to allow clients to be able to find servers without configuration information.

Ephemeral ports: Clients do not need well-known port numbers because they initiate communication with servers, and the port number they are using is contained in the datagram sent to the server. Each client process is allocated a port number as long as it needs it by the host it is running on.

Confusion due to two different applications trying to use the same port numbers on one host is avoided by writing those applications to request an available port from TCP/IP. Because this port number is typically assigned, it may differ from one invocation of an application to the next.

IP Router

A "router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "Routers" can provide more sophisticated routing functions than the minimum functions implemented in IP.

Intranet

Some companies use the same mechanism as the Internet to communicate inside their own corporation. In this case, this mechanism is called an "Intranet". These companies use the same networking/transport protocols and locally based computers to provide access to vast amount of corporate information in a cohesive fashion. As this data may be private to the corporation, and because the members of the company still need to have access to public Internet information, to avoid that people not belonging to the company can access to this private Intranet coming from the public Internet, they protect the access to their network by using a special equipment called a Firewall.

Firewall

A Firewall protects one or more computers with Internet connections from access by external computers connected to the Internet. A Firewall is a network configuration, usually created by hardware and software, that forms a boundary between networked computers within the Firewall from those outside the Firewall. The computers within the Firewall form a secure sub-network with internal access capabilities and shared resources not available from the outside computers. Often, the access to both internal and external computers is controlled by a single computer which includes the Firewall. Since the computer which includes the Firewall directly interacts with the Internet, strict security measures against unwanted access from external computers are required. A Firewall is commonly used to protect information such as electronic mail and data files within a physical building or organization site. A Firewall reduces the risk of intrusion by unauthorised people from the Internet. The same security measures can limit or require special software for people inside the Firewall who wish to access information on the outside. Depending on the requirements, a Firewall can be configured using one or more of the following components:
  Packet-filtering router;
  Application Level Gateway ("Proxy" or "Socks") for controlling the access to information from each side of the Firewall;
  Circuit Level Gateway for relaying TCP and UDP connections.

IP Addressing

IP addresses are used by the IP protocol to uniquely identify a host on the Internet. Strictly speaking, an IP address identifies an interface that is capable of sending and receiving IP datagrams. Each IP datagram (the basic data packets that are exchanged between hosts) comprises a source IP address and a destination IP address. IP addresses are represented by a thirty two bit unsigned binary value which is usually expressed in a dotted decimal format. For example, 9.167.5.8 is a valid Internet address. An IP address is divided between a network and a host part, the first bits of the IP address specifying how the rest of the address is divided. The mapping between the IP address and an easier-to-read symbolic name, for example myhost.ibm.com, is done by the "Domain Name System" (DNS).

Internet Assigned Numbers Authority (IANA)

In order to be assured of any communication between servers in the Internet, all IP addresses have to be officially assigned by the Internet Assigned Numbers Authority (IANA). Because the number of networks on the Internet has been approximately doubling annually for a number of years, it is important not to unnecessarily waste IP addresses that are in a limited number. Many organizations use locally assigned IP addresses, basically comprised within reserved ranges of addresses for private Internist to avoid colliding with officially assigned IP addresses. These IP addresses cannot be routed on the Internet.

IP Subnets

Due to the explosive growth of the Internet, the principle of assigned IP addresses became too inflexible to allow easy changes to local network configurations. These changes might occur when:
  A new type of physical network is installed at a location.
  Growth of the number of hosts requires splitting the local network into two or more separate networks.
  Growing distances require splitting a network into smaller networks with gateways between them.
To avoid requesting additional IP network addresses in case of changes, the concept of subnets has been introduced. The assignment of subnet can be done locally, as the whole network still appears to be one IP network to the outside world. The host number part of the IP address is subdivided into a network number and a host number. This second network is called "sub network" or "subnet". The subnetting is implemented in a way that is transparent to remote networks.

Private IP Addresses

An approach for the conservation of the IP address space, is the use of private IP addresses. This approach relaxes the rule that IP addresses are globally unique by reserving part of the address space for networks that are used exclusively within a single organization and that do not require IP connectivity to the Internet. Any organization can use addresses in particular ranges without reference to any other organization. However, because theses addresses are not globally unique, they cannot be referenced by hosts in another organization and they are not defined to any other external routers. Routers in network not using private addresses are expecting to discard all routing information regarding these addresses. Routers in an organization using private addresses are expected to limit all references to private addresses to internal links; they should neither advertise routes to private addresses to external routers nor forward IP datagrams comprising private addresses to external routers. Hosts having only a private IP address do not have IP layer connectivity to the Internet. All connectivity to external Internet hosts must be provided with "Application Level Gateways", often referred to as a "Proxy".

Application Level Gateway (Proxy)

An Application Level Gateway provides higher level control on the traffic between two networks in that the contents of a particular service can be monitored and filtered according to the network security policy. Therefore, for any desired application, corresponding Proxy code must be installed on the gateway in order to manage that specific service passing through the gateway. A Proxy acts as a server to the client and as a client to the destination server. Though the proxy seems to be transparent from the point of view of the client and the server, the proxy is capable of monitoring and filtering any specific type of data, such as commands, before sending it to the destination.

Availability, Scalability and Load Balancing

The concepts of scaling, balancing and availability are particularly important when looking for effective ways of dealing with the ever increasing amount of network and server load.

- The concept of "scaling" refers to adding more devices to a server or a network, or both, to seamlessly accommodate growth, that is, without interrupting or rebuilding an existing environment and without adversely affecting existing applications.
- The concept of "balancing" refers to sharing, or distributing, a load among multiple devices within a server or a network, or both, to facilitate traffic flows.
- The concept of "availability" refers to providing alternative server or network resources, or both, to seamlessly compensate system or component failures that would otherwise cause down time and/or delay. It is highly desirable to have mechanisms in place that avoid down time and delay by providing an automatic and instant take-over of failing components without disrupting existing connections.

Virtual Router Redundancy Protocol (VRRP)

The use of a statically configured default router minimises configuration and processing overhead on the end host. However, this mode of operation creates a single point of failure. Loss of the default router results in a catastrophic event, isolating all end hosts that are unable to detect any alternate path that may be available. VRRP is designated to eliminate the single point of failure inherent in the static default routed environment. VRRP specifies an election protocol that dynamically assigns responsibility for a virtual router to one of the VRRP routers on a LAN (Local Area Network). The VRRP router controlling the IP address(es) associated with a virtual router is called the "master", and forwards datagrams sent to these IP addresses. The election process provides dynamic fail-over in the forwarding responsibility should the master become unavailable. Any of the virtual router's IP addresses on a LAN can be then be used as the default first hop router by end hosts. The advantage gained from using VRRP is a higher availability default path without requiring configuration of dynamic routing or router discovery protocols on every end host.

Network Load Balancer

A computer acting as server may receive simultaneous requests from various clients and may be not able to answer to these clients in a reasonable time frame. To solve this problem of data availability over the Internet, a server can be implemented using different computers: this set of servers acting as a single server is called a "cluster". However, an Uniform Resource Locator (URL) is normally associated with a single server computer. To hide from the clients the existence of a cluster, a special server computer, called Network Load Balancer (NLB), is used to simplify the access to the data on the different servers of the cluster. The Network Load Balancer:

- can be accessed using a single Uniform Resource Locator (URL) or a single address called "VIP address" (Virtual IP address), or "cluster address", and
- distributes requests from clients to less loaded servers of the cluster.

The Network Load Balancer is the site IP address to which clients send all requests. This externally advertised address is referred to as the cluster address. As many cluster addresses as needed can be defined. The purpose of the Network Load Balancer is for each request received from a client connected to Internet:

- to identify within the cluster, the right server in term of performance, for answering the request, and
- to forward this request to the identified right server.

Note that the right server computer is not always the best server computer, since it is desirable for all eligible server computers to process their share of the load. Even the worst server needs to shoulder some of the burden. If traffic is forwarded only to the best server computer, it will be guaranteed that it will cease to be the best. The choice of the right server computer is realised according to a specific and complex algorithm which is a function of:

- number of active connections;
- number of new connections;
- weight;
- response time; . . . .

The algorithm must achieve an optimal balance in the shortest possible time.

High Availability

A Network Load Balancer already provides high availability, because one of its basic functions is to avoid choosing a failed server. To insure a maximum of availability for the traffic, it is important to suppress single points of failure and to have some redundancy. The load balancing function can optimally be implemented with a secondary/standby Network Load Balancer and a primary/active Network Load Balancer connected on the same subnet. The secondary Network Load Balancer synchronized its state with that of the primary Network Load Balancer and listens for a "heartbeat" from the primary Network Load Balancer. Various additional customer-defined "reachability" criteria can also be specified, such as access to gateway routers across duplicated adapters and networks, etc. . . . If the "heartbeat" fails, or defined reachability criteria are not met, the primary Network Load Balancer is deemed to be down, and the standby Network Load Balancer takes over the role of forwarding datagrams. In the event of a failure, the connection table on the standby Network Load Balancer is closely synchronized with that of the now failed primary Network Load Balancer, so the great majority of the existing connections in flight will survive the failure. The newly active Network Load Balancer still knows where to send all datagrams that it receives, and TCP automatically resends any individual datagrams that where lost during the actual fail over.

More explanations about the technical field presented in the above sections can be found in the following publications incorporated herewith by reference: "TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

Public IP addresses have to be officially assigned by the IANA (Internet Assigned Numbers Authority). This is becoming more and more difficult to achieve because the number of available public IP address ranges is now severely limited. The following is an example of a prior art, complex network and the associated, prior art IP addresses.

FIG. 1 shows a typical implementation of a cluster of network servers 106 according to the Prior Art. These network servers are accessible through:
- an access router or a redundant system of access routers 104 based on the VRRP protocol (Virtual Router Redundancy Protocol). In a preferred embodiment, these access routers are Firewalls.
- a redundant system of Network Load Balancers 105 comprising a primary/active Network Load Balancer and a secondary/standby Network Load Balancer.

Each Network Load Balancer 105 is physically connected to two different subnets
- an Internet Access Subnet 102 where datagrams (for instance, HTTP requests) coming from the Internet 101 are received after having been filtered by a redundant Firewall system 104. This Internet Access Subnet 102 is defined by a range of public IP addresses assigned by the IANA (Internet Assigned Numbers Authority).
- a Network Server Subnet 103 which is used to access the network servers 106. As the network servers 106 are not directly connected to the Internet network 101, this subnet can be defined by a range of private IP addresses.

Each datagram coming from the Internet and addressed to one of the network servers of the cluster, comprises the public IP address of the cluster also called "cluster address" or VIP address (Virtual IP address). The Network Load Balancer 105 does not modify the IP destination address (the cluster address) of the datagram sent by the client 100 when it forwards it to a network server. The TCP/IP stack of the Network Load Balancer modifies only the MAC (Medium Access Control) address of the datagram and sends the datagram to the chosen network server.

To allow the TCP/IP stack on the network server 106 to accept the IP datagram from the Network Load Balancer with the cluster address (the datagram does not contain the private IP address of the network server), and forward it to the chosen port for normal application processing, the cluster address (the Virtual IP address) is installed as a non-advertising alias on each of the network servers of the cluster. An alias is a second IP address to address the same computer. For not being advertised on the Network Server Subnet, the alias is configured on the loopback adapter of each network server and of each Network Load Balancer.

Addressing

FIG. 2 summarises the different public and private IP addresses that are needed to access a cluster of network servers 106 through a system comprising several Firewalls and Network Load Balancers according to prior art:
  Six Public IP addresses on the Internet Access Subnet, allow the communication with the Internet:
    Each Firewall has a dedicated address:
      a Public IP address 201 for one Firewall.
      a Public IP address 202 for the other Firewall.
    The synchronization between Firewalls requests a VRRP address:
      a Public IP address 203 for VRRP
    Each Network Load Balancer has a dedicated address:
      a Public IP address 204 for one Network Load Balancer.
      a Public IP address 205 for the other Network Load Balancer.
    The cluster has a cluster address (also called Virtual IP (VIP) address) used by the client:
      a Public IP address 206.
  Private IP addresses on the Network Server Access Subnet, allow the dispatching of the IP datagrams (HTTP requests) on the network servers:
    A private IP address 207 and 208 is used for each Network Load Balancer and a private IP address 209 and 210 is used for each network server.
    The cluster address (VIP address) 206 is defined as an alias in each network server, to allow the IP stack to process the IP datagram.

In the present configuration, when one public IP address is used to access a network server through the internet network, six public IP addresses have to be reserved.

An object of the present invention is to optimise the number of public IP addresses needed for accessing servers organized in a cluster, where there are a plurality of Network Load Balancers connected on one side to a local area network for accessing said servers, and on another side to an local area network for accessing the Internet; the latter local area network being connected to the Internet by means of one or several of firewalls.

Another object of the present invention is to improve access to a plurality of clustered servers from the Internet using a single public IP address.

SUMMARY OF THE INVENTION

The present invention resides in a method for accessing a cluster of servers from an internet public subnet using a single public IP address. A single firewall or cluster of firewalls with a public IP address is interfaced to the internet public subnet to receive service requests for the cluster of network servers. A first private subnet with a plurality of private IP addresses is interfaced to the single firewall or cluster of firewalls to receive the service requests for the cluster of network servers after passing through the single firewall or cluster of firewalls. A plurality of redundant load balancers with a respective plurality of private IP addresses are interfaced to the first private subnet to receive the service requests for the cluster of networks after passing through the first private subnet. The load balancers are interfaced to a second private subnet. The network servers with respective private IP addresses are interfaced to the second private subnet to receive the service requests from the load balancers.

According to one feature of the present invention, at an initialization time, a private IP address is defined for the network load balancer system within the internet access subnet. When one of the load balancers becomes primary at the initialization time or switches from a standby state to an active state, the network load balancer system private IP address is defined as an alias in an interface table to be recognized by the one load balancer. When the one network load balancer switches from the active state to a standby state, the network load balancer system private IP address previously defined as the alias is released from the interface table.

DETAILED DESCRIPTION OF THE PREFERRED EMBODIMENTS

Figure 1:
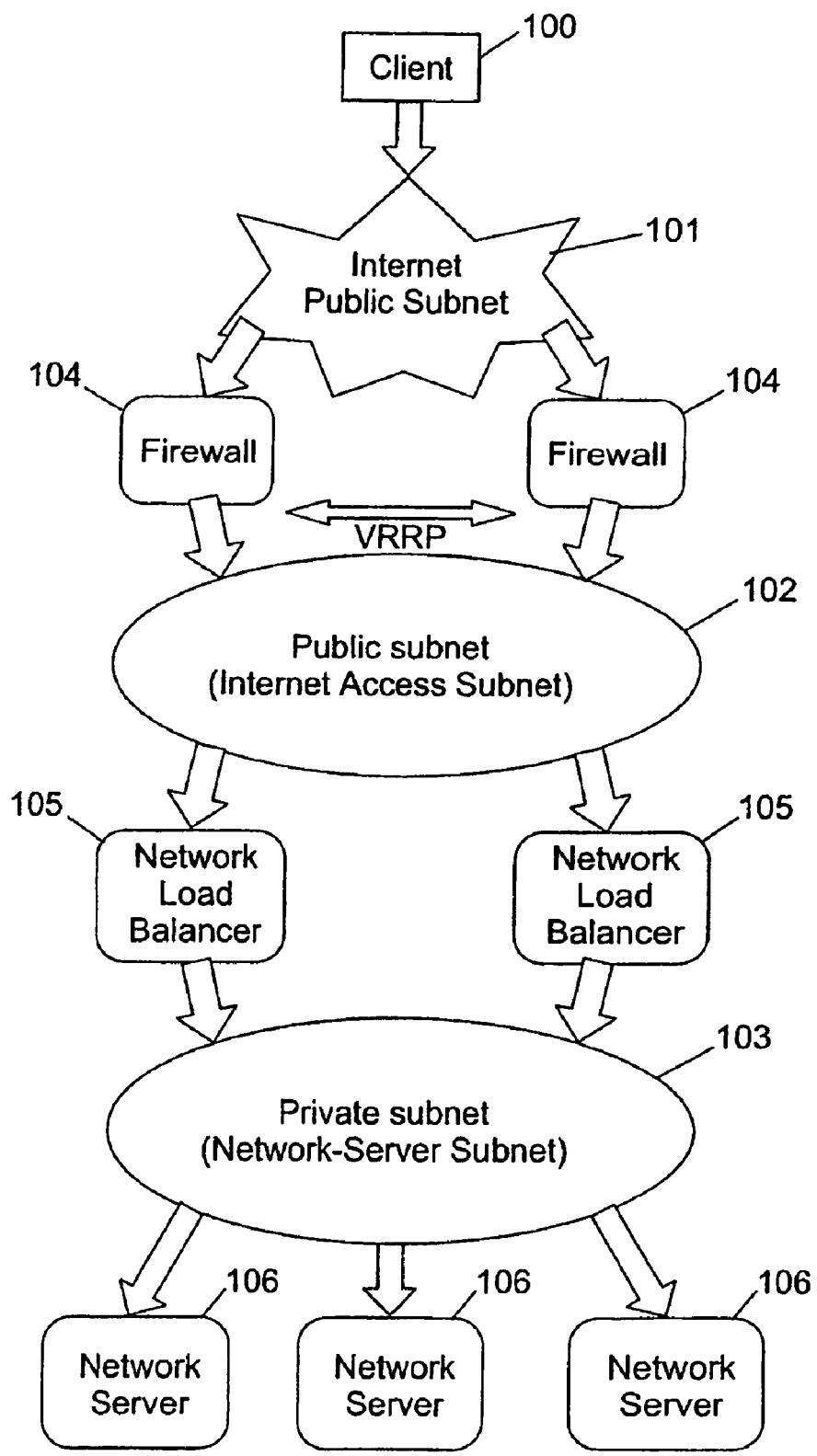
FIG. 1 shows a cluster of servers accessible through a system of Firewalls and Network Load Balancers according to the prior art.
Figure 2:
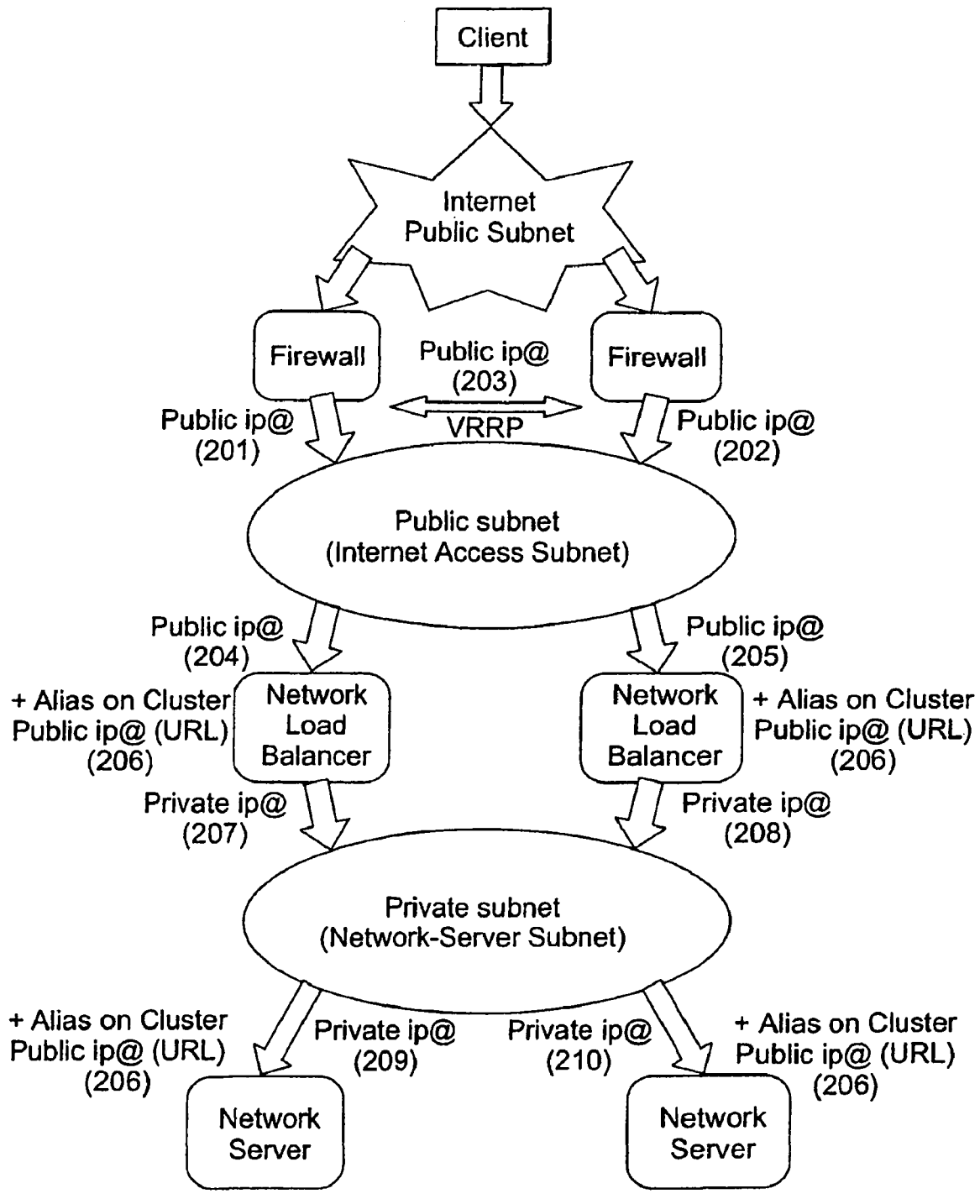
FIG. 2 shows how a plurality of servers can be addressed by means of a system of Firewalls and Network Load Balancers configured according to the prior art.
Figure 3:
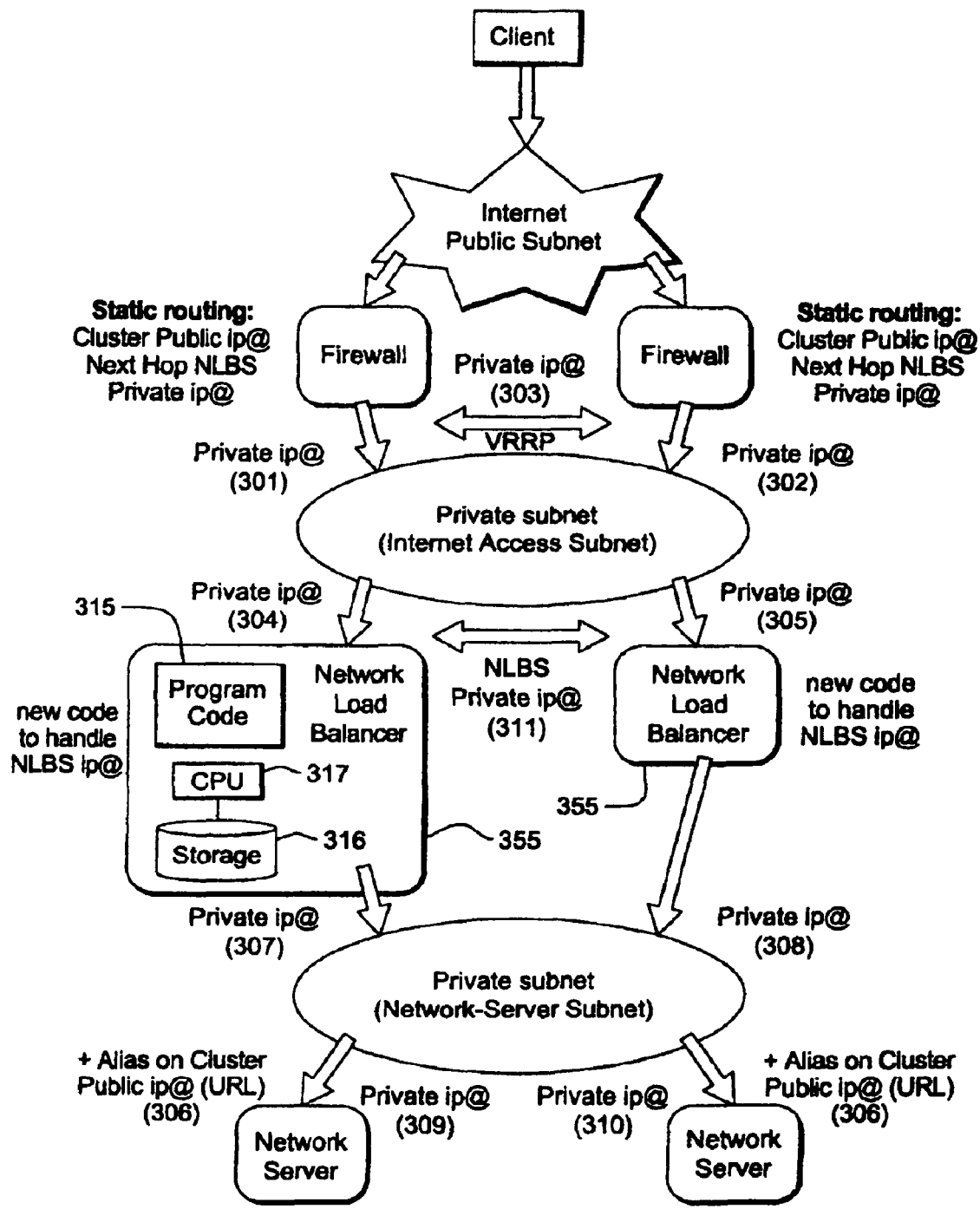
FIG. 3 shows how a plurality of servers can be addressed by means of the system of Firewalls and Network Load Balancers configured according to the present invention.

The system illustrated in FIG. 3, is based on a redefinition of the Internet Access Subnet. To process the datagrams (HTTP requests) coming from the Internet, the access router (or the redundant system of access routers or Firewalls) and the Network Load Balancers 355 are configured to use a range of private IP addresses instead of a range of public IP addresses. A virtual address is defined and managed within this private Internet Access Subnet to access the redundant system of Network Load Balancers. The private IP address used for the Network Load Balancer system will be called "NLBS IP address". The implementation of this solution requires in each Network Load Balancer 355 a specific code 315 and a specific routing mechanism. The specific code 315 is stored in a storage 316 for execution by a central processing unit 317 in each Network Load Balancer 355. In the example shown in FIG. 3, to access a particular network server within the cluster, only the cluster address (VIP address) is required in the URL (Uniform Resource Locator) used by the client. This public IP address, is used to access an HTTP (Hypertext Transfer Protocol) application hosted in one of the network servers. Compared with the configuration described in FIG. 2, up to five Public IP addresses are saved (Public IP addresses 201 to 205 in FIG. 2).

Addressing

FIG. 3 illustrates the IP addressing process according to the present invention
On the Internet Access Subnet:
 Each Firewall has a dedicated private address:
  a Private IP address 301 for one Firewall.
  a Private IP address 302 for the other Firewall.
 The synchronization between Firewalls requests a VRRP address:
  a Private IP address 303 for VRRP.
 Each Network Load Balancer has also a specific address:
  a Private IP address 304 for one Network Load Balancer.
  a Private IP address 305 for the other Network Load Balancer.
 The synchronization between Network Load Balancers now requests a NLBS IP address:
  a Private IP address 311 for the Network Load Balancer system.
On the Network Server Access Subnet:
 A private IP address 307 or 308 is used for each Network Load Balancer, and a private IP address 309 or 310 is used for each network servers.
 A single public IP address (the cluster address) 306 is defined as an alias on each network server. Using an alias allows to not advertise the public IP address 306 on the Network Server Access Subnet.
Compared with prior art, the Internet Access Subnet is defined in a range of private addresses. Because the Network Load Balancers cannot be addressed by the Firewalls using public IP addresses, dynamic routing between Firewalls and Network Load Balancers is no longer possible. A new entry comprising the NLBS IP address defined previously is created in the routing table of each Firewall. At the level of each Firewall, the routing of datagrams according to the present invention is now static. Each Network Load Balancer manages this new virtual private IP address (NLBS IP address) by means of a new specific code.

CONFIGURATION

Firewall

Each Firewall is connected through a physical interface to the Internet Access Subnet defined by the private IP address range. The following IP addresses are assigned to each Firewall:
 a Private IP address 301 for one Firewall and a Private address 302 for the other Firewall;
 a Private VRRP IP address 303 for both Firewalls.

| Interface type | Address |
| --- | --- |
| Port on the Internet Access Subnet | Private IP@ on Internet access subnet |
| Port on the Internet Access Subnet | Private VRRP IP@ |

Network Load Balancer

Each Network Load Balancer comprises:
 an interface connected to the Private Internet Access Subnet. The following IP addresses are assigned to each Network Load Balancer:
  a Private IP address 304 for one Network Load Balancer and a Private IP address 305 for the other Network Load Balancer;
  a Private NLBS IP address 311 for both Network Load Balancers. This address is configured as an Alias only on the Primary/Active Network Load Balancer. This alias is managed by a specific code executed on the Network Load Balancer.
  The cluster address 306 (i.e. the public IP address of the cluster) defined also as an alias on the loopback adapter.
 an interface connected to the Network Server Access Subnet. The following IP address is assigned to each Network Load Balancer:
  A Private IP address 307 for one Network Load Balancer and a Private IP address 308 for the other Network Load Balancer on the Network Server Access Subnet.

| Interface type | Address |
| --- | --- |
| Port on the Internet Access Subnet | Private IP@ on Internet Access Subnet |
| Alias on the Internet Access Subnet | Private NLBS IP@ to manage |
| Alias on loopback adapter | Cluster Public IP@ |
| Port on the Network Server Access Subnet | Private IP@ on Network Server Access Subnet |

A specific code is installed on each Network Load Balancer to handle the NLBS IP address.

Network Servers

The network servers are connected to the Network Server Access Subnet. The following IP addresses are assigned to each network server:

a Private dedicated IP address 309 for one network server and a Private dedicated IP address 310 for the other network server;

a cluster address 306 (i.e. the public IP address of the cluster). This address is defined as an alias on the loopback interface.

| Interface type | Address |
| --- | --- |
| Port on the Network Server Access Subnet | Private IP@ on Network Server Access Subnet |
| Alias on loopback adapter | Cluster Public IP@ |

ROUTING

Firewall

Each Firewall has a specific entry in its own routing table for routing datagrams to the cluster address. This entry comprises the private NLBS IP address. This private NLBS IP address allows routing to the Network Load Balancers all the IP datagram comprising the public IP address of the cluster. The entry in the routing table to address the cluster is as follows:

| Routing device | Destination | Routing | Next hop |
| --- | --- | --- | --- |
| Firewalls | Cluster Public IP@ | Static Route | NLBS IP@ |

Network Load Balancer

The process for distributing IP datagrams among the network servers is the following: the Network Load Balancer selects a destination network server in the cluster according to a specific algorithm and modifies the IP datagram with the MAC (Medium Access Control) address of the selected network server (this is done at the level two of the Open Systems Interconnect-OSI-model). To forward the datagram (HTTP request) to the selected network server, the routing table in the Network Load Balancer is defined as follows:

| Routing device | Destination | Routing | Next hop |
| --- | --- | --- | --- |
| Network Load Balancer | Cluster Public IP@ | Direct routing | Selected network server |

Network Server

The reception of IP datagrams follows the standard process. The IP datagram is accepted by the IP stack because the loopback adapter is configured with the cluster address. To reply to the datagram (HTTP request) that has been received, the routing table entry in the network server uses the VRRP IP address of the Firewalls:

| Routing device | Destination | Routing | Next hop |
| --- | --- | --- | --- |
| Network server | Internet | default | VRRP private IP@ of Firewalls |

NLBS IP Address on the Network Load Balancer

The process on the Network Load Balancer is defined to save expensive and limited Public IP addresses. In a preferred embodiment, each Network Load Balancer handles the newly introduced private virtual IP address (NLBS IP address) using four different scripts (or types of code), each script corresponding to a main internal state:
1. initial state,
2. active state (Primary Network Load Balancer),
3. standby state (Secondary Network Load Balancer), and
4. inop state.

Each time the internal state change, a specific script is called by the Network Load Balancer application. Only one Network Load Balancer can monitor the NLBS IP address at the same time (the Primary Network Load Balancer). The Network Load Balancer in the active state (the Primary Network Load Balancer) acts as master router for this NLBS IP address when the Network Load Balancer in the standby state acts (the Secondary Network Load Balancer) as backup router.

Initial and Active States

At the initialization time, the new NLBS IP address is defined as an alias so that it can be recognized by the Primary Network Load Balancer when it becomes active. Datagrams with this NLBS IP address are accepted and processed by the Primary Network Load Balancer. Because, the new NLBS IP address must not be advertised in the Network Server Access Subnet, the script must create an alias on the interface connected to the Network Server Access Subnet. This alias is associated with the NLBS IP address.

Standby and Inop States

When a Network Load Balancer enters in a standby or inop state, it releases the NLBS IP address. Datagrams sent by the Firewalls are no more accepted by this Network Load Balancer. The script deletes the alias created on the interface connected to the Network Server Access Subnet.

Data Flows

Figure 4:
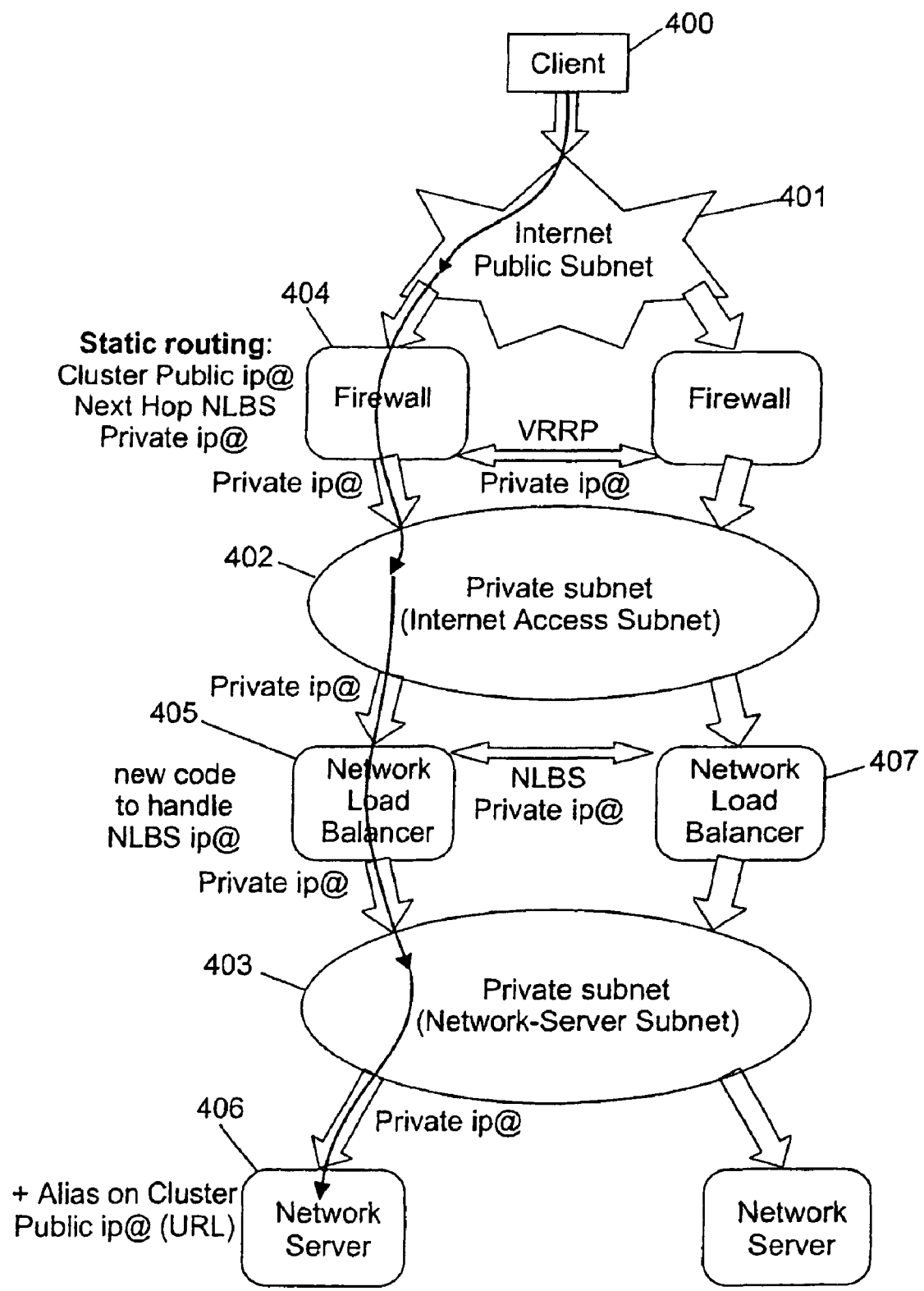
FIG. 4 shows a method for routing a datagram from a client to a network server among a plurality of network servers organized in a cluster according to the present invention.

FIG. 4 illustrates the method according to the present invention of routing an IP datagram (an HTTP request) sent by a client connected to the Internet network, to a network server within a cluster comprising a plurality of networks servers, through a redundant system of Firewalls and Network Load Balancers. The redundant Network Load Balancer system is configured as follows:
The Primary/Active Network Load Balancer 405 has the NLBS IP address defined as an alias in its interface table.
The Secondary/Standby Network Load Balancer 407 doesn't have the NLBS IP address defined as an alias in its interface table.

Main Data Flow

The method of routing an IP datagram to a network server comprises the following steps:

The Master (according to the VRRP terminology) Internet Firewall 404:
  receives from a client 400 connected to Internet 401 a HTTP request encapsulated in an IP datagram.
  identifies the cluster public IP address in the destination IP address field of the received IP datagram.
  identifies in the routing table, the next hop private IP address in the Internet Access Subnet associated with said cluster public IP address. The identified next hop private IP address is the NLBS IP address of the redundant Network Load Balancer system.
  identifies in an ARP (Address Resolution Protocol) table, the physical hardware address associated with this NLBS IP address. An ARP module running on the physical layer of the Master Internet Firewall is responsible for translating higher level protocol addresses (IP addresses) into physical hardware addresses. The ARP module uses a lookup table also called ARP table to perform the translation.

If the physical hardware address is in the ARP table, the Master Internet Firewall 404:
  updates the header (MAC header) of the IP datagram with the physical hardware address (MAC address) of the Primary/Active Network Load Balancer.
  sends the IP datagram to the Primary/Active Network Load Balancer on the Internet Access Subnet.

If the physical hardware address is not in the ARP table, the Master Internet Firewall 404:
  broadcasts an ARP request with the NLBS IP address on the Internet Access Subnet 402. The ARP request is sent out on the Internet Access Subnet to find the physical hardware address of the destination host corresponding to the NLBS IP address.
  waits for a reply. If one of the Network Load Balancers connected to the Internet Access Subnet recognizes the NLBS IP address, it will send back an ARP reply. The reply will contain the physical hardware address of the Primary/active Network Load Balancer. This physical hardware address will be stored in the ARP table of the Master Internet Firewall. All subsequent IP datagrams to this NLBS IP address will then be translated to this physical hardware address as long as:
    the ARP table in the Master Internet Firewall as not be refreshed by a timer time out.
    an ARP request sent by a Network Load Balancer has not been received with a new physical hardware address for the NLBS IP address. When the secondary/standby Network Load Balancer becomes Primary/active, in case of failure on the Primary/active Network Load Balancer, it broadcasts on the Internet Access Subnet an ARP request with its physical hardware address and the associated NLBS IP address. Upon reception of this ARP request, the Primary Internet Firewall replaces in its ARP table the physical hardware address of the now Secondary/standby Network Load Balancer with the physical hardware address of this new Primary/active Network Load Balancer.

The Primary/Active Network Load Balancer 405 which has the NLBS IP address defined as an alias:
  receives the ARP request with NLBS IP address.
  checks that the NLBS IP address is in its interface table.
  sends back an ARP reply comprising its own physical hardware address (its MAC address).

The Secondary/Standby Network Load Balancer 407 which doesn't have the NLBS IP address defined as an alias:
  receives the ARP request with NLBS IP address.
  checks that the NLBS IP address is not in its interface table.
  doesn't send back any ARP reply.

The Master Internet Firewall 404:
  detects the ARP reply with the physical hardware address (MAC address) of the Primary/Active Network Load Balancer.
  updates its ARP table by associating the NLBS IP address with the physical hardware address (MAC address) of the Primary/Active Network Load Balancer.
  updates the header (MAC header) of the IP datagram with the physical hardware address (MAC address) of the Primary/Active Network Load Balancer.
  sends the IP datagram to the Primary/Active Network Load Balancer.

The Primary/Active Network Load Balancer 405:
  detects the IP datagram.
  identifies the physical hardware address (MAC address) in the received IP datagram header (MAC header) as being its own physical hardware address (MAC address).
  accepts the IP datagram.
  identifies the cluster public IP address in the destination IP address field of the received IP datagram.
  selects according to a specific algorithm a network server IP address among the plurality of network servers of the cluster.
  identifies in its ARP table the physical hardware address associated with the selected network server IP address. replaces the destination physical hardware address (MAC address) in the header (MAC header) of the IP datagram with the physical hardware address (MAC address) of the selected network server.
  sends the IP datagram on the Network Server Subnet 403.

The Secondary/Standby Network Load Balancer 407:
  detects the IP datagram.
  does not identify the physical hardware address (MAC address) in the received IP datagram header (MAC header) as being its own physical hardware address (MAC address).
  does not process the IP datagram.

The selected network server 406:
  receives the IP datagram with the cluster IP address in the destination IP address field.
  identifies the physical hardware address in the received IP datagram header as being its own physical hardware address.
  identifies the cluster IP address is in its interface table (because the cluster IP address has been defined as an alias in the network server).
  processes the HTTP request encapsulated in the IP datagram.
  sends back a reply to the Internet Firewall using the VRRP IP address.

The non selected network servers:
   receives the IP datagram with the cluster IP address in the destination IP address field.
   does not recognize the physical hardware address in the received IP datagram header.
   does not process the IP datagram.

Switch from a Network Load Balancer to an Other

When, in case of failure or maintenance, a Network Load Balancer switches from an active state to a standby state and becomes secondary, it:
   releases from its interface table, the NLBS IP address defined as an alias.
When a Network Load Balancer becomes primary at initialization time or switches from a standby state to an active state in case of failure of the Primary/active Network Load Balancer, it:
   defines the NLBS IP address as an alias in its interface table.
   broadcasts an ARP request on the Internet Access Subnet comprising its own physical hardware address and the NLBS IP address to update the ARP tables of the redundant Firewall system.

While the invention has been particularly shown and described with reference to a preferred embodiment, it will be understood that various changes in form and detail may be made therein without departing from the spirit, and scope of the invention.

The invention claimed is:

1. A system for accessing a cluster of servers from a public network using a single public IP address included with an access request from the public network to one or more routing devices coupled to the public network, the single IP address corresponding collectively to the cluster of servers, said system comprising:
   a plurality of load balancers for accessing said cluster of servers, a first private network logically interposed between said one or more routing devices and said plurality of load balancers, and a second private network logically interposed between said plurality of load balancers and said cluster of servers, each of said load balancers comprising:
   a central processing unit, a computer-readable memory and a computer-readable tangible storage device;
   program instructions, responsive to said each load balancer attaining an active state, to record that a common private IP address is an alias for said each load balancer and advertise to the one or more routing devices via the first private network said common private IP address as said alias for said each load balancer, and responsive to said each load balancer switching from the active state to a standby state, to terminate the record that said common private IP address is said alias for said each load balancer, such that only one of said plurality of load balancers processes said access request, said access request including the single public IP address sent from the public network and received via one of the routing devices and the first private network, said one or more routing devices correlating the single public IP address in the access request to said common private IP address;
   program instructions, responsive to said access request, to determine if said each load balancer has a record of the common private IP address as said alias in said each load balancer, and
   if so, process the access request by selecting, based on a load balancing algorithm, one of the servers in the cluster to satisfy the access request and forwarding to the one server the access request, including the single public IP address, with another alias for the one server, the single public IP address with the other alias addressing the one server in the cluster; and
   if not, not process the access request and thereby, not select any of the servers in the cluster to satisfy the access request and not forward the access request to any of the servers in the cluster; and wherein
   all of said program instructions are stored on said computer-readable tangible storage device for execution by said central processing unit via said computer-readable memory.

2. The system of claim 1 wherein one of said load balancers includes program instructions to advertise the common private IP address to the one or more routing devices via the first private network during an initialization process of said one load balancer without an access request from the public network for the common private IP address and without another request from the public network for the common private IP address.

3. The system of claim 1 wherein said one or more routing devices have one or more respective private IP addresses on said first private network for communications with the plurality of load balancers, and said plurality of load balancers have a respective plurality of private IP addresses in said second private subnet.

4. The system of claim 1 wherein the one or more routing devices comprise two or more routing devices, and said two or more routing devices have two or more respective private IP addresses on said first private network for communications with the plurality of load balancers.

5. A computer program product for accessing a cluster of servers from a public network using a single public IP address sent with an access request from the public network to one or more routing devices coupled to the public network, the single IP address corresponding collectively to the cluster of servers, said computer program product comprising:
   one or more computer-readable tangible storage device(s);
   program instructions, stored on the one or more computer-readable tangible storage device(s) for execution in a plurality of load balancers for accessing said cluster of servers, a first private network logically interposed between said one or more routing devices and said plurality of load balancers, and a second private network logically interposed between said plurality of load balancers and said cluster of servers, said program instructions comprising:
   program instructions, responsive to said each load balancer attaining an active state, to record that a common private IP address is an alias for said each load balancer and advertise to the one or more routing devices via the first private network said common private IP address as said alias for said each load balancer, and responsive to said each load balancer switching from the active state to a standby state, to terminate the record that said common private IP address is said alias for said each load balancer, such that only one of said plurality of load balancers processes said access request, said access request including the single public IP address sent from the public network and received via one of the routing devices and the first private network, said one or more routing devices correlating the single public IP address in the access request to said common private IP address;

program instructions, responsive to said access request, to determine if said each load balancer has a record of the common private IP address, as said alias in said each load balancer, and if so, process the access request by selecting, based on a load balancing algorithm, one of the servers in the cluster to satisfy the access request and forwarding to the one server the access request, including the single public IP address, with another alias for the one server, the single public IP address with the other alias addressing the one server in the cluster; and if not, not process the access request and thereby, not select any of the servers in the cluster to satisfy the access request and not forward the access request to any of the servers in the cluster.

6. The program product of claim 5 wherein one of said load balancers includes program instructions, stored on the one or more computer-readable tangible storage device(s) for execution in said one load balancer, to advertise the common private IP address to the one or more routing devices via the first private network during an initialization process of said one load balancer without an access request from the public network for the common private IP address and without another request from the public network for the common private IP address.

7. The program product of claim 5 wherein said one or more routing devices have one or more respective private IP addresses on said first private network for communications with the plurality of load balancers, and said plurality of load balancers have a respective plurality of private IP addresses in said second private subnet.

* * * * *